United States Patent [19]
Lawrence et al.

[11] Patent Number: 5,282,029
[45] Date of Patent: Jan. 25, 1994

[54] OPTIMIZATION OF SIMULATED 3-D EFFECT THROUGH CAMERA TECHNIQUE

[76] Inventors: John Lawrence; Linda S. Lukens, both of 2525 Verbena Dr., Los Angeles, Calif. 90068

[21] Appl. No.: 624,603

[22] Filed: Feb. 19, 1991

[51] Int. Cl.$^5$ .................. G03B 15/00; H04N 5/222
[52] U.S. Cl. ............................. 358/89; 352/44; 352/53; 352/86; 358/229
[58] Field of Search ............ 358/89, 87, 88, 91, 358/108, 3, 229; 352/44, 53, 86; H04N 5/222

[56] References Cited

U.S. PATENT DOCUMENTS

| | | | |
|---|---|---|---|
| 2,058,681 | 10/1936 | Gould | 358/87 |
| 2,538,910 | 1/1951 | Miller | 358/108 |
| 4,131,342 | 12/1978 | Dudley | 358/88 |
| 4,705,371 | 11/1987 | Beard | 350/144 |
| 4,836,647 | 6/1989 | Beard | 358/89 |
| 4,893,898 | 1/1990 | Beard | 358/89 |
| 4,941,041 | 7/1990 | Kenyon | 358/89 |
| 4,943,860 | 7/1990 | Hattori | 358/91 |
| 4,973,087 | 11/1990 | Balogh | 350/140 |
| 5,014,126 | 5/1991 | Pritchard | 358/91 |

*Primary Examiner*—Howard W. Britton

[57] ABSTRACT

Apparatus for optimization of a simulated three-dimensional effect for film or video includes at least one arcuate support rail and a trolley carrying a remotely controlled variable speed motor for moving the trolley along the rail. A camera mounting attached to the trolley is moveable horizontally and vertically with respect to the trolley and permits camera movement at a desired constant angular velocity at a specific and constant radius from the scene being recorded.

4 Claims, 4 Drawing Sheets

OPTIMIZATION OF SIMULATED 3-D EFFECT THROUGH CAMERA TECHNIQUE

RELATED CO-PENDING APPLICATIONS

The following are applications that have been filed by one or both of these inventors relevant to this application: Ser. No. 07/327,039, "Method and Apparatus for Obtaining 3-D Images from 2-D Images, Using the Pulfrich Illusion"; and Ser. No. 07/359,154, "Method and Apparatus for Improvements in the Photographing and Editing of Motion Pictures and Videotapes Utilizing the Pulfrich Illusion."

BACKGROUND OF THE INVENTION

1. Field of the Invention

This invention relates to apparatus and methods for obtaining three-dimensional images from two-dimensional images on either film or videotape.

2. Prior Art

In the 1920s an optical illusion was discovered which has been referred to as the Pulfrich effect or illusion. In order to be elicited, it requires constant motion under very defined conditions. It is able to utilize a single image rather than the conventional dual image. Its discovery resulted in the fact that if one eye is shaded somewhat darker than the other, the exact amounts of which have been discussed in detail in two patents, U.S. Pat. Nos. 4,131,342 and 4,705,371, three dimensional (3-D) viewing is possible. In these two patents, respective inventors Leslie P. Dudley and Terry D. Beard discuss various aspects concerning the illusion of depth that is conferred on the individual viewing the phenomenon. The present investigators have confirmed that only one eye needs shading, and have discovered that the shading, as manifested in a lens, need only be gray and/gradations there of.

Outdoor scenes facilitate the 3-D effect because there is considerable background. Nevertheless, in order to achieve good 3-D, it is also necessary to have very close (to the camera) foreground. This combination with the subject inbetween makes ideal 3-D, whether a dual image or the Pulfrich illusion is to be used.

During the nearly 70 years that have passed since the Pulfrich illusion was discovered, little commercial use has been made of it, other than Dudley's attempt at animation, until Beard and others tried to capture the illusion live, specifically, during the 1989 Pasadena Rose Parade and then the Super Bowl halftime show of the same year.

The Pulfrich illusion requires constant motion in order for the in-depth perception to be achieved. Unfortunately, when viewed with angular camera motion that is not constant in angular velocity or radius, or with both eyes shaded with different neutral-density value filters, many people develop various types of eye strain. These may include double vision or blurred vision, resulting in vertigo or headaches. The present invention enables people engaged in the shooting of stereoscopic illusions using the Pulfrich effect to overcome the problems inherent in capturing the illusion and, at the same time, to reduce the problems associated with viewing it. The shortcoming of the previous applications when used for this purpose will be addressed, and the means of overcoming such shortcomings disclosed.

SUMMARY OF THE INVENTION

In the past, 3-D pictures using the Pulfrich illusion have been shot with the foreground as close as possible to the camera and the background going back a substantial distance, or to the horizon. This becomes a critical problem (which has hindered the development of 3-D technology) when used in confined areas, because stereoscopic visualization has considerable limitations in confined spaces.

This limitation with respect to the Pulfrich illusion explains why the illusion was first used commercially to shoot the Rose Parade, the Super Bowl halftime, and outdoor commercials, all with very large foreground-to-background distances involved.

If one could apply the Pulfrich method to an area as confined as a wrestling or boxing ring, the possibilities for other uses would be enormous. Yet, having a camera directly operated by a cameraman while the camera moves continuously around the inside of, or is stationed within, a stationary ring presents impossible logistics. Minimally, the seats of the spectators would preclude having a dolly traveling in front of them and obscuring their vision.

In the present invention, the camera can be suspended from the ceiling and all operations of the camera operated remotely. The camera moves in and out, up and down, while circularly traveling around the ring. When the camera moves to its lowest position, minimal blocking of spectator viewing occurs. This is an improvement over the prior art.

The cameraman operates the camera remotely by looking at a monitor, and, with one eye shaded, the cameraman sees 3-D illusion as it is being shot. This is important to facilitate the best creative development of the event being photographed using the Pulfrich effect.

Additionally, a self-propelled vehicle, moving about on circular tracks surrounding the subjects being filmed or videotaped, may be employed. It carries a camera which itself does not move in or out, and whose focus remains fixed for certain shots. For flat footage, the camera can change location, zoom in and out, or simply remain still, all in one scene. This camera records action anywhere in the scene.

During circular motion shots, the camera always travels at uniform (constant) angular velocity. If more depth to the 3-D is desired, the camera is speeded up. It is recognized that angular velocity exceeding thirty degrees per second will destroy the 3-D illusion and that angular velocity of less than ten degrees per second will create little or no 3-D illusion, this finding comprising part of the novelty of the present invention.

For any given radius of the camera to the object(-s) being photographed, as measured in the horizontal plane of the object(-s), that is, the true radius, the linear circumferential speed of the camera has been discovered to require constant velocity to obtain optimal depth of illusion. Stated differently, the angular velocity of the camera about the object(-s) must be invariant, for constancy in the amount of 3-D illusion, whatever the true radius of the camera to the object(-s) is.

All operational techniques discovered that elicit the 3-D illusion by usage of constant angular velocity, angular motion itself, and specific circular motion with specific radii are essential discoveries of the present invention.

When it is desirable to shoot the video indoors in a confined space, with a single scene being used repeatedly (a wrestling match, boxing match, etc.), floor space will be limited and cannot be cluttered with vehicles and tracks. Furthermore, to have tracks on the floor with moving vehicles on them in a small space will present a hazard to people who are walking about when the room is not being used for cinematography. In addition, people might desire to use the space for other purposes when there is no filming or videotaping. Finally, to have a cameraman operate a camera directly in a confined space not only obstructs the view of spectators, but, also, might interfere with the action of the scene being filmed. Yet, the camera must be instantly ready when action needs to be videotaped.

Thus, when other events need the shooting space, a fixed circular monorail or dual tracks similar to a side-by-side pair of circular curtain tracks can be attached to the ceiling with the lights placed inbetween and, in the case of an arena, drawn up when not in use.

Once the essential but cumbersome technique of obtaining circular camera motion to elicit 3-D illusion is accomplished, as discussed above, the next step in optimizing this 3-D illusion in a confined space is the lighting and color arrangement. Considerable lighting is required to elicit the 3-D illusion. Fortunately, the ceiling-held rails or circular-moving arm are permanently fixed, so the lights can be attached to the ceiling out of the way of the camera and left there. Illumination approaching the intensity of daylight is required, and in a confined space this is much less of a problem than on a sound stage or in an auditorium.

For optimal 3-D illusion, the lights illuminating the film stage will vary in intensity and in the timing of use. Light levels illuminating the scene nearest the camera are, typically, between 200 and 250 foot-candles intensity. Light levels illuminating the middle ground should be, typically, between 225 and 350 foot-candles intensity. Finally, light levels illuminating the background should be, typically, between 250 and 450 foot-candles intensity. Also, the timing of the lights optimizes the 3-D illusion. A number of the lights farthest from the moving camera will be, typically, sequentially shut off, while a number of those closest to the camera which have not been in use will be, typically, sequentially turned on; the sequencing of all lights being dependent on the position of the moving camera and other factors. This operational technique of dynamically altering illumination to enhance 3-D illusion originates with the present invention.

Finally, the fixed position of the lights relative to the objects being filmed is consequential. Backlighting objects, whether in the foreground, the middle ground or the background optimizes the 3-D illusion. The present investigators have built upon certain basic depth/color perception discoveries, including those placed in the public domain in 1958 by Dr. Edwin Land, inventor of the Polaroid process. The use of backlighting to optimize simulated 3-D effect is a discovery of the present invention.

Selection and placement of color is essential to elicit the 3-D illusion in a confined space. Very bright lighting, combined with an easily perceived distinction among the colors used and with a variety of colors, is necessary. Because filming is in a confined area, for optimal 3-D, the colors must range over the entire visible spectrum, although not every color is needed. Each of the layers of colors closet to the camera is typically separated by a full color in the spectrum. This discovered sequence of colors takes advantage of the natural chromostereoscopic effects of color created in the human brain. However, since the chromostereoscopic effect of the general 3-D illusion due to color is less than that created by the camera motion, the sequence of colors for color separation should be as diverse from each other as possible. In other words, each layer of color should be a primary color or a secondary color.

The contrast in colors can be enhanced by the use of colored lights interspersed with white lights to illuminate the film stage. The ratio of the chosen colored lamps to white lamps, each of the same wattage, is typically between 2:1 and 4:1, with specific ratios dependent on the color of the colored lights, the colors of the scene, and the location of the colored lights vis-a-vis the camera. It is recognized that the ratio of colored to white light is important, as too much colored light will reduce the foot-candles of illumination, thereby diminishing the 3-D illusion.

Novelties of the present invention include the recognition of proper selection and placement of color and color intensity, and the development of specific ratios of colored to white lighting at specific distances to the camera.

DETAILED DESCRIPTION OF THE PREFERRED EMBODIMENT

Figure 1:
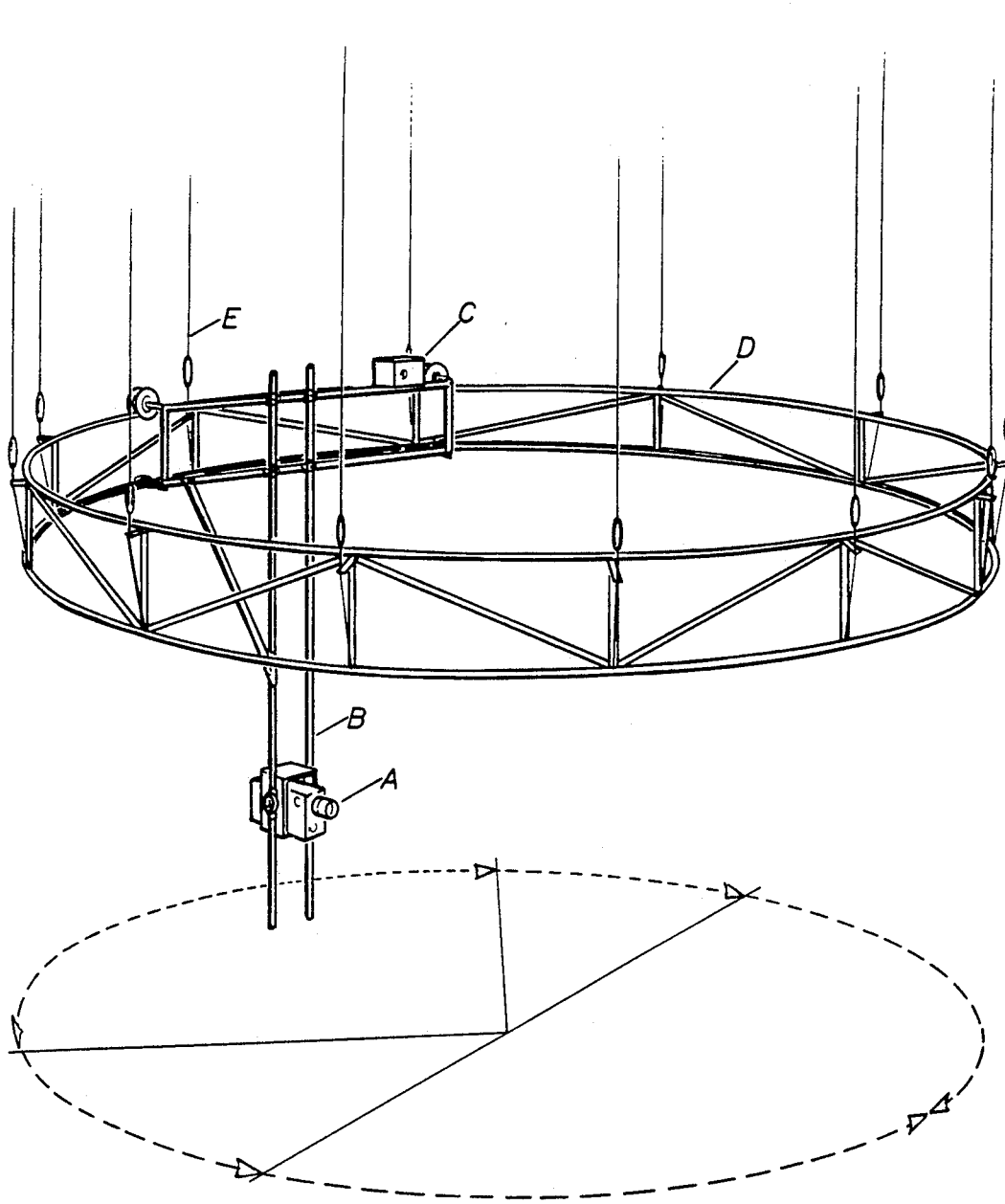
FIG. 1 illustrates a room viewed from the ceiling, with the room to have a videocamera rotate in a complete circle.

FIG. 1 illustrates camera A secured to and suspended from aluminum camera support B, comprising columnar braces attached to a motorized trolley. Variable-speed motor C moves support B and camera A upon circular tracks D. The entire assembly of camera A, support B, motor C and tracks D is suspended from the ceiling from guy wires E.

Figure 2:
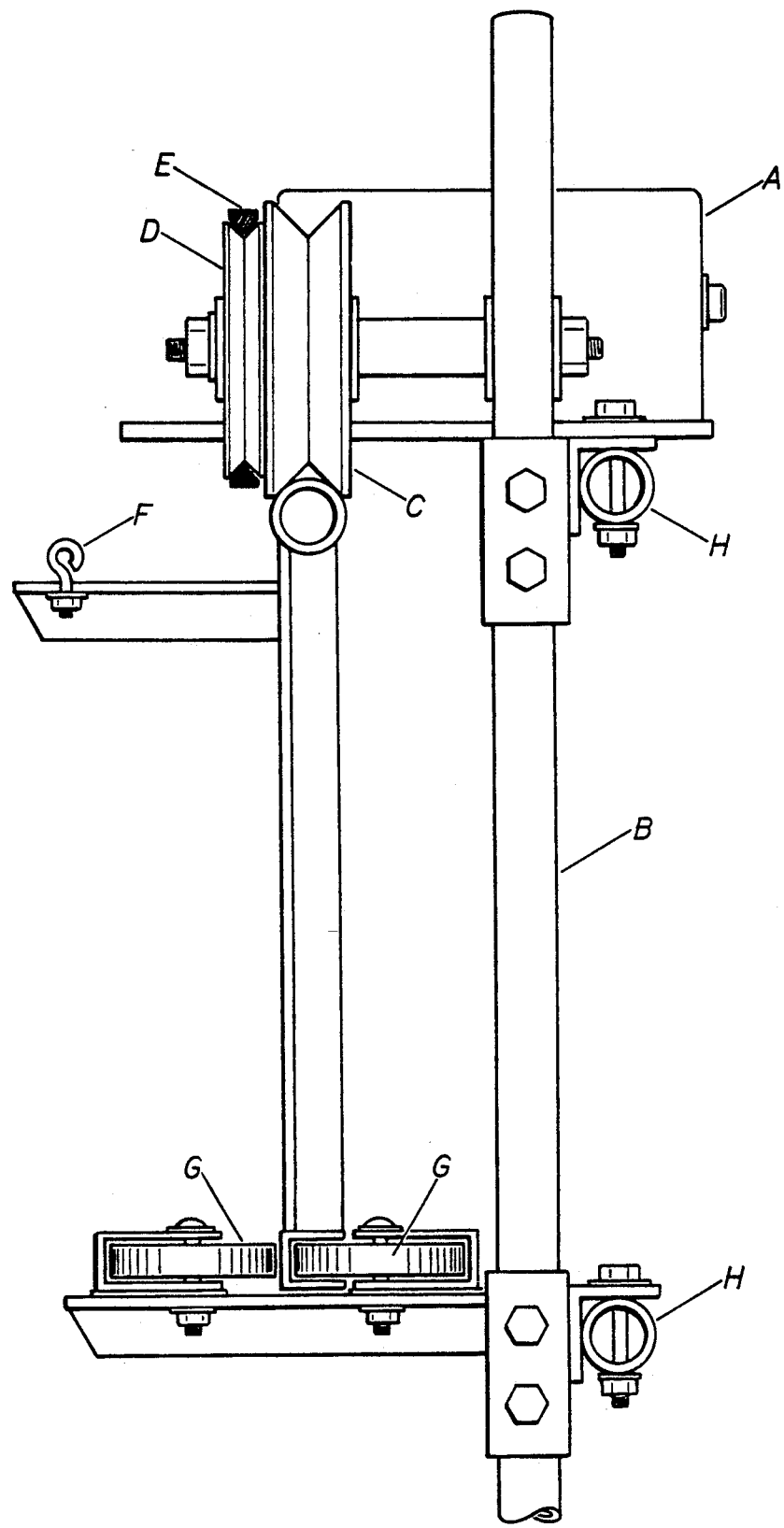
FIG. 2 illustrates in detail a videocamera adapted for movement along circular tracks as in FIG. 1.

FIG. 2 illustrates in detail the motorized trolley in FIG. 1. Variable-speed motor A is remotely controlled, and moves the trolley through connection to ribbed drive belt E. Belt E is connected to ribbed belt groove casing D, which is bolted to V-groove drive wheel C. Wheel C sits upon the trolley track. As the trolley moves upon the track, restraint wheels G control the sway and, thereby, the focus of camera A, which, although not shown, is suspended by aluminum camera support B. Platform and hook F comprise means by which to slide camera A up and down along support B. Turn screw H enables tilting of the trolley and, hence, camera A.

Figure 3:
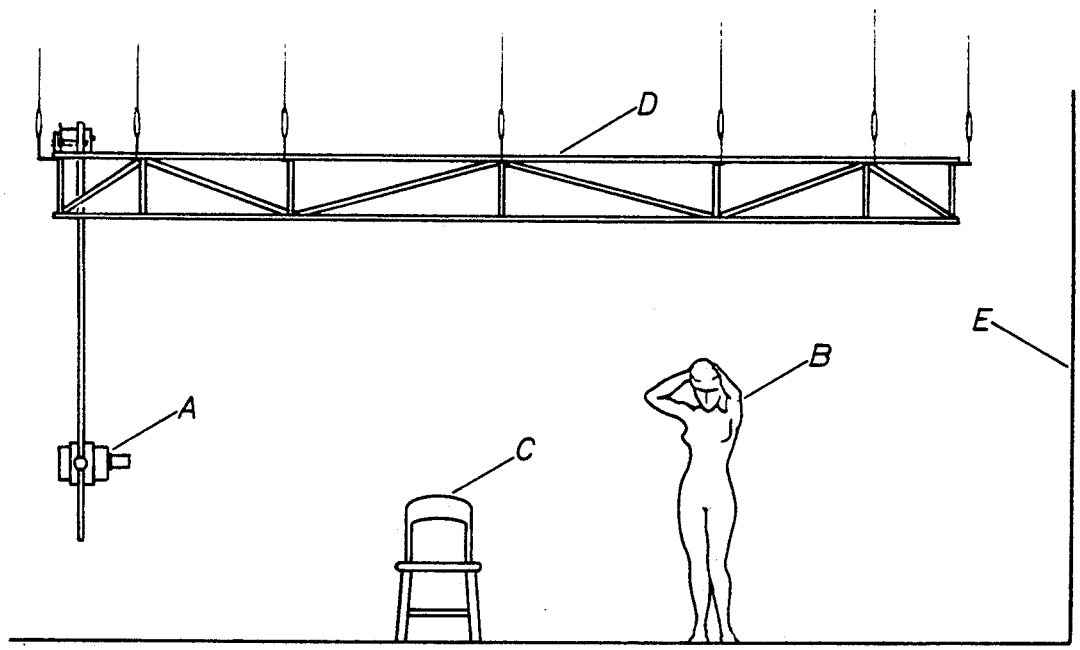
FIG. 3 illustrates a section through a room in which the camera and the film stage are in the same vertical plane.

FIG. 3 illustrates the assembly of FIG. 1 in relation to the film stage. Tracks D are suspended directly above the film stage, with the tracks and the film stage forming concentric circles. Subject B, prop C, and backdrop E are shown in relation camera A.

Figure 4:
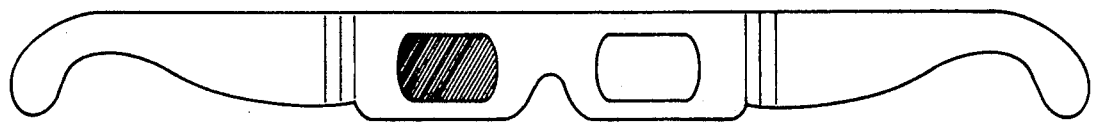
FIG. 4 illustrates a pair of viewing glasses with one lens darkened to filter the light passing through it.

FIG. 4 illustrates a pair of viewing glasses with one lens darkened to filter the light passing through it. The other lens is transparent. This creates a 3-D illusion as the brain processes the image coming from each eye, when these vieweing glasses are used in conjunction with constant angular motion of a camera at constant speed.

What is claimed:

1. A process for optimizing a simulated three-dimensional effect for film or video comprising:

illuminating a scene having foreground, middle ground and background portions with a combination of high intensity light sources having a preponderance of a different hue for each of said foreground, middle ground and background portions, and having a pronouced distinction in hue between said foreground and said middle ground, and between said middle ground and said background, said different hues to range over the entire visible electromagnetic spectrum, and said pronounced distinctions in hue to be defined as the distinction between, at a minimum, a primary color and one of its corresponding secondary colors.

2. The cinematographic technique of claim 1 wherein the scene being filmed is backlit.

3. The cinematographic technique of claim 1 wherein said different hues and said pronounced distinction in hue are enhanced by a specific interspersion of colored lights with the white lights for illumination, said interspersion typically comprising a ratio of colored lamps to white lamps between 2:1 and 4:1, where all of said lamps are of the same wattage.

4. Apparatus for optimization of a simulated three-dimensional effect for film or video when constancy of said effect is desired, comprising:

at least one ARCUATE support rail, a trolley affixed movably to said support rail, a remotely controlled variable speed motor affixed to said trolley for moving said trolley along said support rail, a camera mounting affixed to said trolley and movable horizontally and vertically with respect to said trolley, whereby a camera is moved at a constant angular velocity relative to a scene to be filmed or recorded and wherein said angular velocity is defined as linear circumferential speed at a specific and constant radius from said scene, and said angular velocity is between ten degrees per second and thirty degrees per second.

* * * * *